United States Patent
Yang (10) Patent No.: US 10,803,554 B2
(45) Date of Patent: Oct. 13, 2020

(54) IMAGE PROCESSING METHOD AND DEVICE

(71) Applicant: BOE Technology Group Co., Ltd., Beijing (CN)

(72) Inventor: Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 96 days.

(21) Appl. No.: 16/247,202

(22) Filed: Jan. 14, 2019

(65) Prior Publication Data

US 2019/0347767 A1    Nov. 14, 2019

(30) Foreign Application Priority Data

May 11, 2018   (CN) .......................... 2018 1 0446417

(51) Int. Cl.
```
G06T 3/40      (2006.01)
G06K 9/00      (2006.01)
G06T 7/11      (2017.01)
G06K 9/62      (2006.01)
```
(52) U.S. Cl.
CPC ........ *G06T 3/4053* (2013.01); *G06K 9/00825* (2013.01); *G06K 9/6215* (2013.01); *G06K 9/6218* (2013.01); *G06T 3/4007* (2013.01); *G06T 7/11* (2017.01); *G06T 2207/10024* (2013.01); *G06T 2207/20021* (2013.01); *G06T 2207/20084* (2013.01); *G06T 2207/30252* (2013.01)

(58) Field of Classification Search
CPC ....... G06T 3/4053; G06T 7/11; G06T 3/4007; G06T 2207/10024; G06T 2207/20021; G06T 2207/20084; G06T 2207/30252; G06K 9/00825; G06K 9/6215; G06K 9/6218
See application file for complete search history.

(56) References Cited

U.S. PATENT DOCUMENTS

2018/0376151 A1\*  12/2018  Begaint ................ H04N 19/177

OTHER PUBLICATIONS

Li et al, "Video super-resolution using an adaptive superpixel-guided auto-regressive model", 2016, Pattern Recognition 51 (2016), pp. 59-71 (13 pages) (Year: 2016).\*

\* cited by examiner

*Primary Examiner* — David F Dunphy
(74) *Attorney, Agent, or Firm* — Westman, Champlin & Koehler, P.A.

(57) ABSTRACT

An image processing method and an image processing device are provided. The method includes acquiring an initial image, performing super-pixel segmentation on the initial image, and acquiring final image blocks; extracting a region of interest from the final image blocks in accordance with an image feature of a target image; and performing super-resolution reconstruction on the region of interest and acquiring an optimized image.

20 Claims, 3 Drawing Sheets

IMAGE PROCESSING METHOD AND DEVICE

CROSS-REFERENCE TO RELATED APPLICATION

The present application claims a priority of a Chinese patent application No. 201810446417.9 filed in China on May 11, 2018, a disclosure of which is incorporated herein by reference in its entirety.

TECHNICAL FIELD

The present disclosure relates to a field of image processing technology, and in particular, relates to an image processing method and an image processing device.

BACKGROUND

Although a photography technology has been developed rapidly, it is still difficult for a camera device to acquire a high-resolution image in many scenarios due to a restriction of a cost or an application environment of the camera device, and thereby subsequent identification and detection for an image are adversely affected.

SUMMARY

An image processing method, an image processing device, an electronic device and a computer readable storage medium are provided in the present disclosure.

In a first aspect, an image processing method is provided in the present disclosure and includes acquiring an initial image, performing super-pixel segmentation on the initial image, and acquiring final image blocks; extracting a region of interest from the final image blocks in accordance with an image feature of a target image; and performing super-resolution reconstruction on the region of interest and acquiring an optimized image.

Optionally, the performing super-pixel segmentation on the initial image includes steps of: (a) segmenting the initial image equally into the plurality of image blocks, setting an initial cluster center for each of the plurality of image blocks, and assigning a cluster tag to the each of the plurality of image blocks; (b) calculating a similarity between each pixel point in the initial image and a cluster center of each of the plurality of image blocks, selecting a cluster center corresponding to a highest similarity, and assigning, to the pixel point, a same cluster tag as a cluster tag assigned to one image block of the plurality of image blocks, wherein the cluster center corresponding to the highest similarity is located in the one image block of the plurality of image blocks; (c) determining new segmentation regions in accordance with the cluster tag assigned for each pixel point, and calculating a new cluster center for each of the new segmentation regions; (d) performing an iterative operation by repeating the (b) and the (c), until final cluster centers are acquired after the iterative operation converges; and (e) performing a cluster searching operation in accordance with the final cluster centers and cluster tags of segmentation regions in which the final cluster centers are located, and determining pixel points of each segmentation region of the segmentation regions in which each of the final cluster centers corresponding to the segmentation region is located, and acquiring the final image blocks corresponding to the segmentation regions.

Optionally, the similarity between each pixel point and the cluster center is calculated through following equations:

$$d_{lab} = \sqrt{(l_i - l_j)^2 + (a_i - a_j)^2 + (b_i - b_j)^2}$$
$$d_{xy} = \sqrt{(x_i - x_j)^2 + (y_i - y_j)^2}$$
$$d = d_{lab} + \frac{m}{S} d_{xy}$$
$$S = \sqrt{N/K},$$

wherein $d_{lab}$, is a color distance between a pixel point i and a cluster center of an image block j in a LAB color space, $d_{xy}$ is a coordinate distance between the pixel point i and the cluster center of the image block j in a X-Y coordinate system, d is a similarity between the pixel point i and the cluster center of the image block j, l is a luminance in the LAB color space, a and b are color parameters in the LAB color space, x and y are coordinate parameters, m is an adjustment factor, S is a distance between initial cluster centers of two adjacent image blocks, N is a quantity of pixel points in the initial image, and K is a quantity of the image blocks initially segmented equally.

Optionally, the performing the cluster searching operation includes: performing the cluster searching operation at a radius of k*S, where k is a searching radius coefficient.

Optionally, the image feature includes at least one of a position feature, a color feature or a shape feature.

Optionally, the extracting the region of interest from the final image blocks in accordance with the image feature of the target image, includes: setting different weight values for the plurality of image blocks at different positions in accordance with the position feature of the target image; extracting color regions associated with the color feature of the target image from the initial image in accordance with the color feature of the target image; extracting shape regions associated with the shape feature of the target image from the initial image in accordance with the shape feature of the target image; and extracting the region of interest in accordance with one or more of the color feature and the shape feature as well as the different weight values set for the plurality of image blocks at different positions.

Optionally, the setting different weight values for the plurality of image blocks at different positions, includes: segmenting the initial image into a plurality of first portions and a second portion, and setting a weight value of the second portion as 0, and setting weight values of the plurality of first portions of the initial image to decrease gradually in a direction from the plurality of first portions to the second portion.

Optionally, the extracting the region of interest in accordance with one or more of the color feature and the shape feature as well as the different weight values set for the plurality of image blocks at different positions includes: expanding a region acquired in accordance with the one or more of the color feature and the shape feature as well as the different weight values set for the image blocks at different positions, and acquiring the region of interest.

Optionally, the performing super-resolution reconstruction on the region of interest, includes: scaling up the region of interest through a bicubic interpolation to a predetermined size and acquiring the scaled-up region; and performing a non-linear mapping operation on the scaled-up region through a convolutional network, and acquiring the optimized image having a high-resolution.

Optionally, the convolutional network includes three convolutional layers, and sizes of convolution kernels in the three convolutional layers are 9×9, 1×1, and 5×5 respectively, and an amount of features outputted by first and second convolutional layers of the three convolutional layers are 64 and 32, respectively.

Optionally, an initial cluster center of each of the plurality of image block is a pixel point corresponding to a geometrical center or a gravity center of the image block.

Optionally, the cluster center corresponding to the highest similarity is a cluster center corresponding to a minimum value of the similarity d.

Optionally, the method further includes: detecting a target in the optimized image through a Histogram of Oriented Gradients (HOG) and a Support Vector Machine (SVM).

In a second aspect, an image processing device is provided in the present disclosure and includes: a super-pixel segmentation circuitry, configured to acquire an initial image, performing super-pixel segmentation on the initial image, and acquire final image blocks; a region-of-interest extraction circuitry, configured to extract a region of interest from the final image blocks in accordance with an image feature of a target image; and a super-resolution reconstruction circuitry, configured to perform super-resolution reconstruction on the region of interest and acquiring an optimized image.

Optionally, the super-pixel segmentation circuitry is further configured to: (a) segment the initial image equally into the plurality of image blocks, set an initial cluster center for each of the plurality of image blocks, and assign a cluster tag to the each of the plurality of image blocks; (b) calculate a similarity between each pixel point in the initial image and a cluster center of each of the plurality of image blocks, select a cluster center corresponding to a highest similarity, and assign, to the pixel point, a same cluster tag as a cluster tag assigned to one image block of the plurality of image blocks, wherein the cluster center corresponding to the highest similarity is located in the one image block of the plurality of image blocks; (c) determine new segmentation regions in accordance with the cluster tag assigned for each pixel point, and calculate a new cluster center for each of the new segmentation regions; (d) perform an iterative operation by repeating the (b) and the (c), until final cluster centers are acquired after the iterative operation converges; and (e) perform a cluster searching operation in accordance with the final cluster centers and cluster tags of segmentation regions in which the final cluster centers are located, and determine pixel points of each segmentation region of the segmentation regions in which each of the final cluster centers corresponding to the segmentation region is located, and acquire the final image blocks corresponding to the segmentation regions.

Optionally, the similarity between each pixel point and the cluster center is calculated through following equations:

$$d_{lab} = \sqrt{(l_i - l_j)^2 + (a_i - a_j)^2 + (b_i - b_j)^2}$$

$$d_{xy} = \sqrt{(x_i - x_j)^2 + (y_i - y_j)^2}$$

$$d = d_{lab} + \frac{m}{S} d_{xy}$$

$$S = \sqrt{N/K},$$

wherein $d_{lab}$ is a color distance between a pixel point i and a cluster center of an image block j in a LAB color space, $d_{xy}$ is a coordinate distance between the pixel point i and the cluster center of the image block j in a X-Y coordinate system, d is a similarity between the pixel point i and the cluster center of the image block j, l is a luminance in the LAB color space, a and b are color parameters in the LAB color space, x and y are coordinate parameters, m is an adjustment factor, S is a distance between initial cluster centers of two adjacent image blocks, N is a quantity of pixel points in the initial image, and K is a quantity of the image blocks initially segmented equally.

Optionally, the super-pixel segmentation circuitry is further configured to perform the cluster searching operation at a radius of k*S, where k is a searching radius coefficient.

Optionally, the image feature includes at least one of a position feature, a color feature or a shape feature, wherein the region-of-interest extraction circuitry is further configured to: set different weight values for the plurality of image blocks at different positions in accordance with the position feature of the target image; extract color regions associated with the color feature of the target image from the initial image in accordance with the color feature of the target image; extract shape regions associated with the shape feature of the target image from the initial image in accordance with the shape feature of the target image; and extract the region of interest in accordance with one or more of the color feature and the shape feature as well as the different weight values set for the plurality of image blocks at different positions.

Optionally, the super-resolution reconstruction circuitry is further configured to: scale up the region of interest through a bicubic interpolation to a predetermined size and acquire the scaled-up region; and perform a non-linear mapping operation on the scaled-up region through a convolutional network, and acquire the optimized image having a high-resolution.

In a third aspect, an image processing device is provided in the present disclosure, and includes: at least one processor, and a storage in communication with the at least one processor and configured to store instructions executable by the at least one processor, wherein when the instructions are executed by the at least one processor, the at least one processor implements the image processing method according to the first aspect.

In a fourth aspect, a non-volatile computer readable storage medium is provided in the present disclosure and stores computer programs on the non-volatile computer readable storage medium, wherein when the computer programs are executed by a computer processor, the computer process executes the image processing method according to the first aspect.

DETAILED DESCRIPTION

In order to make objective, technical solutions and advantages of the present disclosure more apparent, the present disclosure will be described hereinafter clearly and completely in conjunction with embodiments and in reference to drawings.

Such words as "first" and "second" used in the present disclosure are used to differentiate different entities or parameters having similar names. The words such as the "first" and the "second" are only used for purpose of facilitating description, and should be understood as limiting the scope of the present disclosure.

In some scenarios, an object in an image captured and having a low resolution cannot accurately be identified due to the low resolution of the image. For example, detection of traffic lights is one of most important functions for a self-driving technology. Due to sizes and application scenarios of the traffic lights, the traffic lights are usually relatively small objects in an image acquired by a vehicle-mounted camera, and background interference in the image is relatively complex. In addition, due to an imaging capability of the vehicle-mounted camera, the image containing the traffic lights generally has a relatively low resolution, and thereby subsequent identification and detection for the image may be adversely affected.

The present disclosure provides an image processing method based on super-pixel segmentation and super-resolution construction. The method in the present disclosure extracts a potential position of a target and reconstructs a high-resolution image, and thus may acquire an optimized image with a higher definition and a higher resolution, which are beneficial to the subsequent identification and detection.

Figure 1:
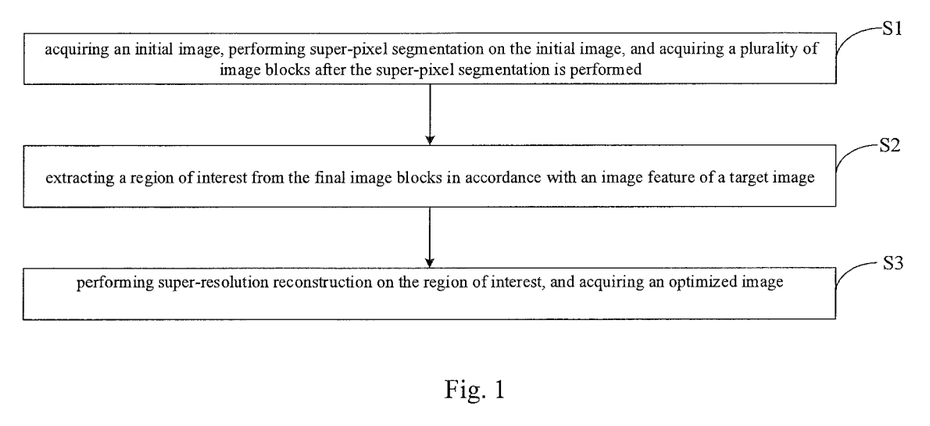
FIG. 1 is a flowchart of an image processing method according to some embodiments of the present disclosure.

Referring to FIG. 1, FIG. 1 is a flowchart of an image processing method provided in the present disclosure. The image processing method in the present disclosure includes step S1 to S3.

Step S1: acquiring an initial image, performing super-pixel segmentation on the initial image, and acquiring a plurality of image blocks after the super-pixel segmentation is performed.

In the present disclosure, the initial image may be an image acquired by a camera, e.g., a camera of a self-driving vehicle. In other words, the initial image is an original image needing to be further processed or a digital image acquired by subjecting the initial image to a digital processing. A target image to be identified may probably be a small portion of the initial image, and a remaining portion of the initial image is interference information or background information.

The super-pixel segmentation herein refers to segmenting a digital image (i.e., the initial image or the digital image acquired from the initial image) into a plurality of image sub-regions so as to acquire a plurality of sets of pixels. Each of the plurality of image sub-region is called as a super-pixel.

The present disclosure uses the super-pixel segmentation technology to segment the initial image into the plurality of image blocks which are smaller and beneficial to subsequent extraction of an image feature. In addition, the super-pixel segmentation in the present disclosure may segment portions having same visual features into a same one of the plurality of image blocks, and further facilitate differentiating the target image from the background interference.

Figure 2:
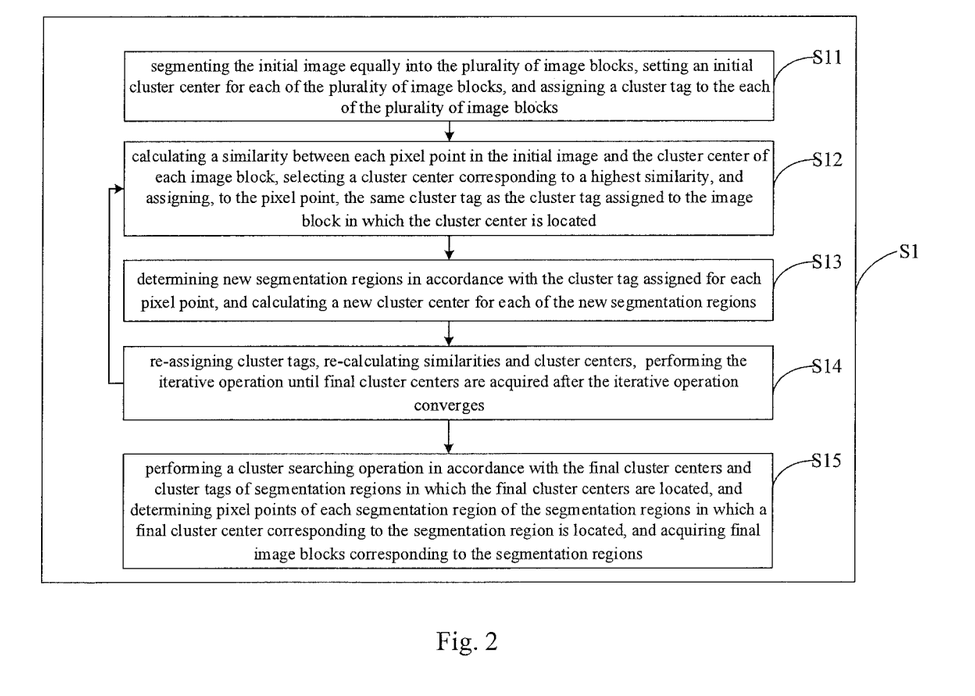
FIGS. 2-4 are detailed flowcharts of steps of the image processing method according to some embodiments of the present disclosure.

In the present disclosure, optionally, the performing the super-pixel segmentation on the initial image in the step S1 may include Sub-steps S11 to S15, as shown in FIG. 2.

Sub-step S11: segmenting the initial image equally into the plurality of image blocks, setting an initial cluster center for each of the plurality of image blocks, and assigning a cluster tag to the each of the plurality of image blocks.

The segmenting the initial image equally into the plurality of image blocks includes segmenting the initial image into the plurality of image blocks with a same area or a same shape. A seed point is selected in each of the plurality of image blocks acquired after the super-pixel segmentation is performed, and the seed point is set as the initial cluster center for the image block. The cluster tag is assigned to each of the plurality of image blocks, so that different ones of the plurality of image blocks may have different initial cluster centers or different cluster tags.

In the present disclosure, optionally, the plurality of image blocks may be rectangular image blocks with the same area or the same shape.

Optionally, the initial cluster center (or the seed point) of each image block may be a pixel point corresponding to a geometrical center or a gravity center of the image block. In a case that the initial image has been equally segmented into the plurality of image blocks, the initial cluster centers (or the seed points) may be distributed evenly in the initial image, and a quantity of the initial cluster points may be the same as a quantity of the plurality of image blocks. For example, if the initial image is equally segmented into N image blocks, the quality of the initial cluster centers may be N and the N initial cluster centers may be distributed evenly in the initial image, wherein the N is a positive integer greater than 1.

Sub-step S12: calculating a similarity between each pixel point in the initial image and the cluster center of each image block, selecting a cluster center corresponding to a highest similarity, and assigning, to the pixel point, the same cluster tag as the cluster tag assigned to the image block in which the cluster center is located.

The pixel point is a minimum unit identifiable in the initial image. For example, if the initial image has a resolution of 256*256, the initial image may have 256 pixel points in each of a widthwise direction and a lengthwise direction. By calculating the similarly between each pixel point and the initial cluster center of each image block, the pixel point may be associated with the initial cluster center corresponding to the highest similarity. Next, the same cluster tag as the cluster tag of the image block in which the initial cluster center corresponding to the highest similarity is located may be assigned to the pixel point, and subsequently further clustering operation on the pixel point may be performed in accordance with the cluster tag of the pixel point and the cluster center corresponding to the cluster tag. Each cluster tag may be set for identifying one image block corresponding to the cluster tag. If the quantity of the plurality of image blocks is N, cluster tags of the N image blocks may be set as 1, 2, 3, . . . , and N, respectively.

It should be noted that, highest similarity in the present disclosure refers to a highest similarity degree, i.e., closest similarity between a pixel point and a corresponding cluster center. The smaller a value of the similarity calculated through following equations is, the higher the similarity degree is.

Optionally, the similarity between each pixel point and a cluster center is calculated through the following equations:

$$d_{lab} = \sqrt{(l_i - l_j)^2 + (a_i - a_j)^2 + (b_i - b_j)^2}$$

$$d_{xy} = \sqrt{(x_i - x_j)^2 + (y_i - y_j)^2}$$

$$d = d_{lab} + \frac{m}{S} d_{xy}$$

$$S = \sqrt{N/K},$$

where $d_{lab}$ represents a color distance between a pixel point i and a seed point j (i.e., a cluster center of an image block j) in a LAB color space, $d_{xy}$ represents a coordinate distance between the pixel point i and the seed point j in a X-Y coordinate system, d represents the similarity between the pixel point i and the seed point j, l represents a luminance in the LAB color space, a and b represent color parameters in the LAB color space, x and y represent coordinate parameters, m represents an adjustment factor, S represents a distance between initial cluster centers of two adjacent image blocks, N represents a quantity of pixel points in the initial image, and K represents a quantity of the image blocks initially segmented equally. A X-axis direction in the X-Y coordinate system may correspond to the lengthwise direction of the initial image, a Y-axis direction in the X-Y coordinate system may correspond to the widthwise direction of the initial image, and an upper left corner of the initial image may be set as an origin of the X-Y coordinate system. In the above equations, the adjustment factor may be a parameter for adjusting the color distance and the coordinate distance and be used to balance weight values of the two distances. Usually, the adjustment factor may have a value within a range from 1 to 40, i.e., [1, 40].

For example, if the initial image includes N pixel points and is segmented into K square-shaped super-pixel image blocks having a same size, each of the image blocks may have a size of N/K, and the distance S between the initial cluster centers of two adjacent image blocks of the plurality of image blocks may be approximately equal to $S=\sqrt{N/K}$. In this way, each pixel point is represented by a 5-dimensional eigenvector i.e., features (the parameters l, a and b) in the LAB color space and features (an abscissa value (x value) and an ordinate value (y value)) in the X-Y coordinate system, and the similarity between each pixel point and each seed point (i.e., the cluster center) may be calculated.

Sub-step S13: determining new segmentation regions in accordance with the cluster tag assigned for each pixel point, and calculating a new cluster center for each of the new segmentation regions.

In accordance with the initial cluster centers and the cluster tag assigned to each pixel point in the sub-step S12, all pixel points matched with a certain initial cluster center may be grouped together as one new segmentation region. Since the new segmentation region is different from any one of the image blocks acquired after the initial image is initially segmented equally, a new cluster center for the new segmentation region may be calculated, and a pixel point with the highest similarity (i.e., a minimum similarity gradient mentioned above) is set as the new cluster center in the new segmentation region, i.e., an iterative operation is performed.

Step S14: re-assigning cluster tags, re-calculating similarities and cluster centers according to the sub-step S12 and the sub-step S13, and performing the iterative operation until final cluster centers are acquired after the iterative operation converges.

Through the iterative operation, a cluster center of each segmentation region does not change any more, and thus pixel points in each segmentation region do not change any more.

Sub-step S15: performing a cluster searching operation in accordance with the final cluster centers and cluster tags of segmentation regions in which the final cluster centers are located, and determining pixel points of each segmentation region of the segmentation regions in which a final cluster center corresponding to the segmentation region is located, and acquiring final image blocks corresponding to the segmentation regions.

When the cluster centers do not change any more, each of the cluster centers and a cluster tag of pixel points in the segmentation region in which the cluster center is located may be determined. Hence, through the cluster searching operation, pixel points having a same cluster tag may be grouped to correspond to a cluster center corresponding to the cluster tag, and thereby the final image blocks are obtained through clustering and segmentation.

Optionally, the performing the cluster searching operation in sub-step S15 may include performing the cluster searching operation at a radius of k*S, wherein k represents a searching radius coefficient. Usually, a point beyond the radius of k*S has no influence on a current segmentation including a cluster center or does not belong to the cluster center. Thus, only pixel points within the radius of k*S need to be considered, so as to increase an efficiency of the cluster searching operation. A value of the k may be adjusted in accordance with practical needs, e.g., the value of the k may be 1 or 2.

Step S2: extracting a region of interest from the final image blocks in accordance with an image feature of a target image.

Since the initial image includes a large quantity of background interference information, the initial image needs to be segmented in respect of the image feature of a portion (i.e., the target image) of the initial image to be acquired, so as to thereby exclude interference factors being irrelevant or having a large deviation amount. The image feature of the target image in the region of interest obtained in such way may be more evident, and may facilitate a subsequent reconstruction operation.

Optionally, a corresponding threshold may be set for each of the image blocks, and then the region of interest may be acquired through a threshold segmentation method. The threshold segmentation method is a region-based image segmentation processing technology, in which different feature thresholds are arranged and pixel points in an image are classified into several types for facilitating a subsequent feature extraction operation.

Figure 3:
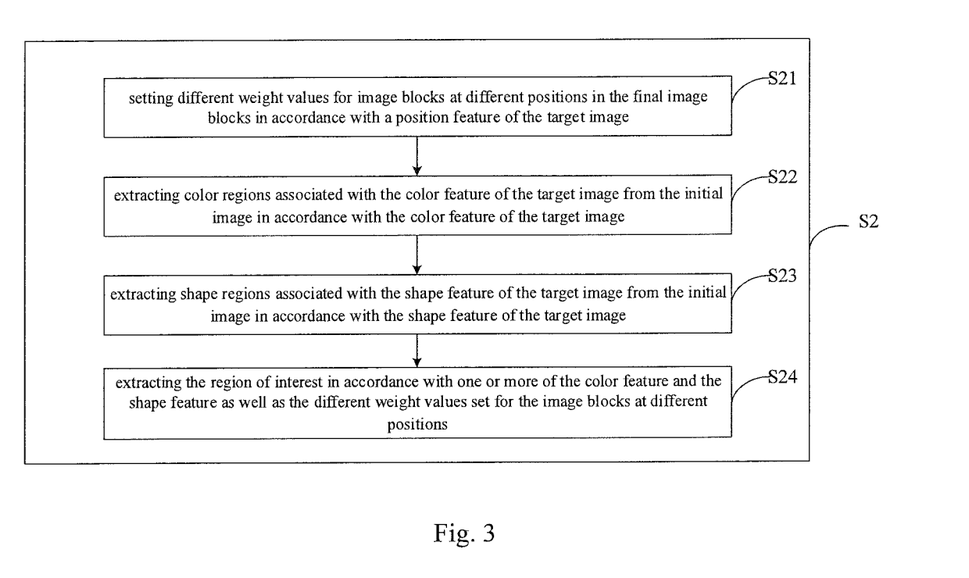

Optionally, the image feature may include at least one of a position feature, a color feature, or a shape feature. Optionally, the step S2 of extracting the region of interest from the final image blocks in accordance with the image feature of the target image may include at least one of the following sub-steps S21 to S24, as shown in FIG. 3.

Sub-step S21: setting different weight values for image blocks at different positions in the final image blocks in accordance with a position feature of the target image.

Through setting the different weight values for the image blocks at different positions in the final image blocks in accordance with the position feature of the target image, the interference information may be excluded in accordance with the position feature of the target image.

The position feature of the target image in an image acquired by a camera may be determined in accordance with a position of the camera. For example, in case that the target image is an image about the traffic lights and the position of the camera is relatively high or an elevation angle of the camera is relatively high, a position of the traffic lights in the image may most probably occur at an upper portion of the image. Accordingly, a larger weight value may be set for the portion of the image at which the traffic lights occur with a maximum probability, and smaller weight values may be set for other portions of the image. For example, the initial image may be segmented into a plurality of first portions and a second portion, a weight value of the second portion may be set as 0, and weight values of the plurality of first portions of the initial image may be set to decrease gradually in a direction from the first portions to the second portion.

The weight value may also be set in accordance with a structural feature of the target image. For example, if the target image is an image of the traffic lights, the traffic lights may include a red light and a green light, or the red lamp, the green lamp and a yellow lamp, arranged vertically or horizontally. Structures of the target image may be different due to an arrangement manner of the lights, a shape of each of the lights or a distance between adjacent ones of the traffic lights. In such a case, weight value distribution adapted to the position feature and the structural feature of the target image needs to set according to the position feature and the structural feature of the target image adaptively, so that extraction of the image feature of the target image is more accurate.

Sub-step S22: extracting color regions associated with the color feature of the target image from the initial image in accordance with the color feature of the target image.

Through extracting the color regions associated with the target image from the initial image in accordance with the color feature of the target image, interference caused by colors of the interference information may be avoided.

Sub-step S23: extracting shape regions associated with the shape feature of the target image from the initial image in accordance with the shape feature of the target image.

Sub-step S24: extracting the region of interest in accordance with one or more of the color feature and the shape feature as well as the different weight values set for the image blocks at different positions.

Further, the sub-step S24 of extracting the region of interest in accordance with one or more of the color feature and the shape feature as well as the different weight values set for the image blocks at different positions further includes: expanding a region acquired in accordance with the one or more of the color feature and the shape feature as well as the different weight values set for the image blocks at different positions, so as to acquire the region of interest.

In this way, through analyzing and expanding the region including the target image extracted above, the obtained region of interest may include more information associated with the target image and irrelevant information is excluded, and thereby a resolution of the image may be increased. For example, in case that the extracted region including the target image has a radius of r, the region may be expanded to a region having a radius of 1.5 r, so as to prevent some marginal information from being omitted during identifying the target image.

Step S3: performing super-resolution reconstruction on the region of interest, and acquiring an optimized image.

The super-resolution reconstruction refers to an image processing technology through which an image or an image sequence having a low-resolution (LR) is processed through a computer to acquire an image or an image sequence having a high-resolution (HR).

Figure 4:
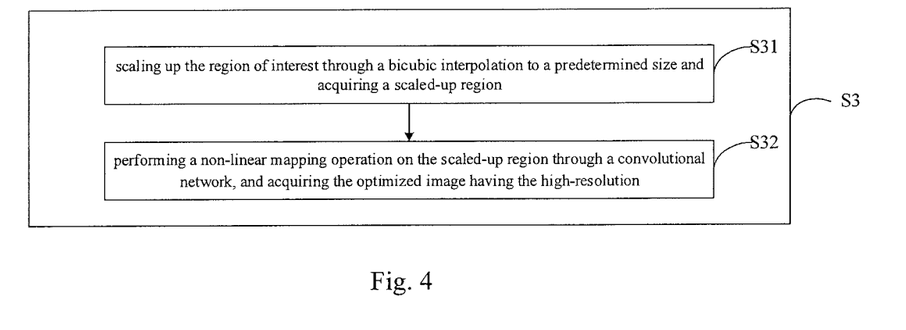

In some embodiments of the present disclosure, the step S3 of performing super-resolution reconstruction on the region of interest and acquiring an optimized image may include sub-steps S31 and S32, as shown in FIG. 4.

Sub-step S31: scaling up the region of interest through a bicubic interpolation to a predetermined size and acquiring a scaled-up region.

Through the bicubic interpolation, the image feature of the target image in the initial image may be shown more clearly after the initial image is segmented, especially after multiple pieces of interference information are eliminated, and thereby the resolution may be increased.

Sub-step S32: performing a non-linear mapping operation on the scaled-up region through a convolutional network, and acquiring the optimized image having the high-resolution.

Optionally, the convolutional network may include three convolutional layers, and sizes of convolution kernels in the three convolutional layers are 9×9, 1×1, and 5×5 respectively, and an amount of features outputted by first and second convolutional layers of the three convolutional layers may be 64 and 32, respectively.

Figure 5:
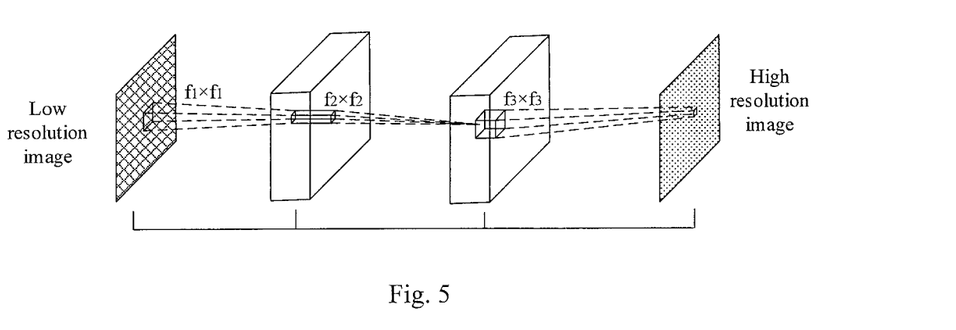
FIG. 5 is a schematic view of a super-resolution reconstruction based on a convolutional network according to some embodiments of the present disclosure.

Referring to FIG. 5, FIG. 5 is a schematic view of the super-resolution reconstruction based on the convolutional network according to some embodiments of the present disclosure. f1×f1, f2×f2 and f3×f3 in FIG. 3 represent the sizes of the convolution kernels in the three convolutional layers, respectively. Optionally, the f1, the f2 and the f3 may have values of 9, 1, and 5, respectively.

In FIG. 5, the low-resolution image is inputted into the convolutional network and processed, such as a feature extraction processing and a scale-up processing may be performed on the low-resolution image, and the high-resolution image may be outputted.

It should be noted that, using the bicubic interpolation and the convolutional network above is an optional scheme, and any other algorithm may also be adopted actually to perform the feature extraction processing and the scale-up processing on the region of interest, which will not be particularly defined herein.

According to above, the image processing method provided in the embodiments of the present disclosure combines the super-pixel segmentation and the super-resolution reconstruction, and thus the region of interest may be extracted in accordance with the image feature of the target image to be acquired after the super-pixel segmentation is performed on the initial image, and then the optimized image may be acquired through the super-resolution reconstruction, and accordingly the resolution of the optimized image is remarkably increased over the resolution of the initial image. As a result, through analyzing features of the target image, not only irrelevant interference information in the initial image may be eliminated, but also the image feature of the target image may be displayed more prominently. In other words, the optimized image with the higher definition and the higher resolution may be obtained in the present disclosure, thereby facilitating subsequent detection and identification operations.

An example in which the target image is an image of the traffic lights and the initial image is an image acquired by a self-driving vehicle is described hereinafter. It should be appreciated that, although description below is provided through the example in which he target image is an image of the traffic lights and the initial image is an image acquired by a self-driving vehicle, technical solutions of the present disclosure may also be applied to other target images and other initial images; examples of applying the technical solutions of the present disclosure based on principles of the present disclosure may be understood by one of ordinary skills in the art, and will not be particularly defined herein.

In this example, the initial image is an image acquired by a vehicle-mounted camera in the self-driving vehicle. A position of the traffic lights in the initial image acquired by the vehicle-mounted camera is generally at a upper half portion of the initial image, and a probability that the position of the traffic lights is at a lower half portion of the initial image is very low; and the higher a portion of the initial image is, the larger a probability that the position of the traffic lights occurs in portion of the initial image is. Thus, a probability that the position of the traffic lights occurs in the initial image decreases gradually from a top side of the initial image to a lower side of the initial image. In addition, since the position of the traffic lights may probably not occur at the lower half portion of the initial image, a weight value for the lower half portion of the initial image may be set as 0, and weight values for portions of the initial image at the upper half portion of the initial image may be set to decrease gradually. In this way, through the position feature of the traffic lights, a large quantity interference information may be eliminated, and the target image may be caused to be more prominent, especially for the image of the traffic light which is a relatively small region in the initial region.

The traffic lights generally include a red light, a green light and a yellow light, and the red (R) light and the green (G) light occur frequently (i.e., a time period within which the red light and the green light occur is longer than a time period within which the yellow light occurs). The color feature of the image of the traffic lights may be determined to include two colors, i.e., the red and the green, or three colors, i.e., the red, the green and the yellow. In such as, the image of the traffic lights may be separated into independent R, G, and B channels, and thereby to a red region and a green region may be extracted from the region of interest (ROI), or the red region, the green region and a yellow region may be extracted from the region of interest.

The traffic lights generally are of a circular shape. The shape feature of the image of the traffic lights may also be a circular shape. In such a case, the circular shape may be extracted by using a Hough transformation, and regions which are not of a circular shape may be excluded.

Optionally, during identifying the image of the traffic lights, only a portion of the traffic lights may probably be identified. Hence, in order to acquire a region including an entirety of the traffic lights, the region of interest needs to be expanded to acquire the region including the entirety of the traffic lights. For example, if the green light has been identified, because the red light is generally arranged above the green light or arranged at a left side of the green light, a green region and a region located above or at the left side of the green region and having an area being twice or more times of that of the green region may be selected as a region including the entirety of the traffic lights. Optionally, if the red light has been identified, a red region and a region located below or at a right side of the red region and having an area being twice or more times of that of the red region may be selected as the region including the entirety of the traffic lights. Here, the twice or more times may be an extension coefficient selectable in accordance with practical needs.

Through selecting the shape feature and setting the extension coefficient, not only regions that do not have the shape feature may be excluded, but also prevent too much information from being omitted, and thereby an accuracy and validity of the image being processed are ensured.

Optionally, the image processing method of the present disclosure may further include detecting, through a HOG (Histogram of Oriented Gradient) plus a SVM (Support Vector Machine), a target in the optimized image having been re-constructed, so as to, e.g., detect a specific state of the traffic lights is the red light or the green light.

Figure 6:
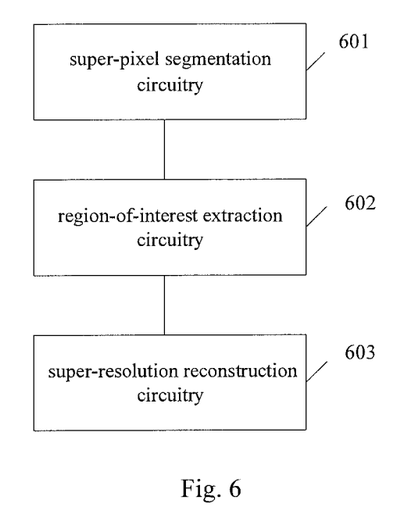
FIG. 6 is a structural schematic view of an image processing device according to some embodiments of the present disclosure.

Referring to FIG. 6, FIG. 6 is a structural schematic diagram of an image processing device provided in the present disclosure. The image processing device includes a super-pixel segmentation circuitry 601, a region-of-interest extraction circuitry 602, and a super-resolution reconstruction circuitry 603.

The super-pixel segmentation circuitry 601 is configured to acquire the initial image and perform the super-pixel segmentation on the initial image, and acquire the final image blocks.

Optionally, the initial image may be an image acquired by a camera, e.g., a camera of the self-driving vehicle. In other words, the initial image is an original image needing to be further processed or a digital image acquired by subjecting the initial image to a digital processing. The target image to be identified may probably be a small portion of the initial image, and a remaining portion of the initial image is interference information or background information.

The region-of-interest extraction circuitry 602 is configured to extract the region of interest from the final image blocks in accordance with the image feature of the target image.

Optionally, the target image may be an image to be acquired from the initial image, e.g., an image of the traffic lights in the initial image acquired by the camera of the self-driving vehicle.

The super-resolution reconstruction circuitry 603 is configured to perform the super-resolution reconstruction on the region of interest, and acquire the optimized image.

In some embodiments of the present disclosure, the super-pixel segmentation circuitry 601 is further configured to: segment the initial image equally into the plurality of image blocks, set the initial cluster center for each of the plurality of image blocks, and assign the cluster tag to the each of the plurality of image blocks; calculate the similarity between each pixel point in the initial image and the cluster center of each image block, select a cluster center corresponding to a highest similarity, and assign, to the pixel point, the same cluster tag as the cluster tag assigned to the image block in which the cluster center is located; determine new segmentation regions in accordance with the cluster tag assigned for each pixel point, and calculate a new cluster center for each of the new segmentation regions; re-assign cluster tags, re-calculate similarities and cluster centers, and perform the iterative operation until final cluster centers are acquired after the iterative operation converges; perform the cluster searching operation in accordance with the final cluster centers and cluster tags of segmentation regions in which the final cluster centers are located, and determine pixel points of each segmentation region in which a final cluster center corresponding to the segmentation region is located, and acquire final image blocks corresponding to the segmentation regions.

The segmenting the initial image equally into the plurality of image blocks includes segmenting the initial image into the plurality of image blocks with the same area or the same shape. The seed point is selected in each of the plurality of image blocks acquired after the super-pixel segmentation is performed, and the seed point is set as the initial cluster center for the image block. The cluster tag is assigned to each of the plurality of image blocks, so that different ones of the plurality of image blocks may have different initial cluster centers or different cluster tags.

Optionally, the initial cluster center (or the seed point) of each image block may be a pixel point corresponding to a geometrical center or a gravity center of the image block.

Optionally, the similarity between each pixel point and a cluster center is calculated through the following equations:

$$d_{lab} = \sqrt{(l_i - l_j)^2 + (a_i - a_j)^2 + (b_i - b_j)^2}$$
$$d_{xy} = \sqrt{(x_i - x_j)^2 + (y_i - y_j)^2}$$
$$d = d_{lab} + \frac{m}{S}d_{xy}$$
$$S = \sqrt{N/K},$$

where $d_{lab}$ represents a color distance between a pixel point i and a seed point j in the LAB color space, $d_{xy}$ represents a coordinate distance between the pixel point i and the seed point j in the X-Y coordinate system, d represents the similarity between the pixel point i and the seed point j, l represents a luminance in the LAB color space, a and b represent color parameters in the LAB color space, x and y represent coordinate parameters, m represents an adjustment factor, S represents a distance between initial cluster centers of two adjacent image blocks, N represents a quantity of pixel points in the initial image, and K represents a quantity of the image blocks initially segmented equally.

For example, if the initial image includes N pixel points and is segmented into K square-shaped super-pixel image blocks having a same size, each of the image blocks may have a size of N/K, and the distance S between the initial cluster centers of two adjacent image blocks of the plurality of image blocks may be approximately equal to S=√N/K. In this way, each pixel point is represented by a 5-dimensional eigenvector; i.e., features (the parameters l, a and b) in the LAB color space and features (an abscissa value (x value) and an ordinate value (y value)) in the X-Y coordinate system, and the similarity between each pixel point and each seed point (i.e., the cluster center) may be calculated.

Optionally, the cluster searching operation is performed at the radius of k*S, wherein k represents the searching radius coefficient. The value of the k may be adjusted in accordance with practical needs, e.g., the value of the k may be 1 or 2.

Optionally, the image feature may include at least one of the position feature, the color feature, or the shape feature.

The region-of-interest extraction circuitry 602 is further configured to: set different weight values for image blocks at different positions in the final image blocks in accordance with the position feature of the target image; extract color regions associated with the color feature of the target image from the initial image in accordance with the color feature of the target image; extract shape regions associated with the shape feature of the target image from the initial image in accordance with the shape feature of the target image; extract the region of interest in accordance with one or more of the color feature and the shape feature as well as the different weight values set for the image blocks at different positions.

In some embodiments of the present disclosure, optionally, the region-of-interest extraction circuitry 602 is further configured to: segment the initial image into the plurality of first portions and the second portion, set a weight value of the second portion as 0, and set weight values of the plurality of first portions of the initial image to decrease gradually in the direction from the first portions to the second portion.

For example, in the initial image acquired by the camera of the self-driving vehicle, the target image of the traffic lights may probably be located at the upper half portion of the initial image. In such as case, the weight value of the lower half portion of the initial image may be set as 0, and the weight values for portions of the initial image at the upper half portion of the initial image may be set to decrease gradually in the direction from top to down.

Optionally, the region-of-interest extraction circuitry 602 is further configured to expand a region acquired in accordance with the one or more of the color feature and the shape feature as well as the different weight values set for the image blocks at different positions, and acquire the region of interest.

In this way, through analyzing and expanding the region including the target image extracted above, the obtained region of interest may include more information associated with the target image and irrelevant information is excluded, and thereby a resolution of the image may be increased. For example, in case that the extracted region including the target image has a radius of r, the region may be expanded to a region having a radius of 1.5 r, so as to prevent some marginal information from being omitted during identifying the target image.

Optionally, the super-resolution reconstruction circuitry 603 is further configured to: scale up the region of interest through the bicubic interpolation to the predetermined size and acquire the scaled-up region; and perform the non-linear mapping operation on the scaled-up region through the convolutional network, and acquire the optimized image having the high-resolution.

Optionally, the convolutional network may include three convolutional layers, and sizes of convolution kernels in the three convolutional layers are 9×9, 1×1, and 5×5 respectively, and an amount of features outputted by first and second convolutional layers of the three convolutional layers may be 64 and 32, respectively.

According to the above, the image processing device provided in the present disclosure may have same technical features as those of the image processing method of the present disclosure, and have same technical effects, which will not be repeated herein.

Figure 7:
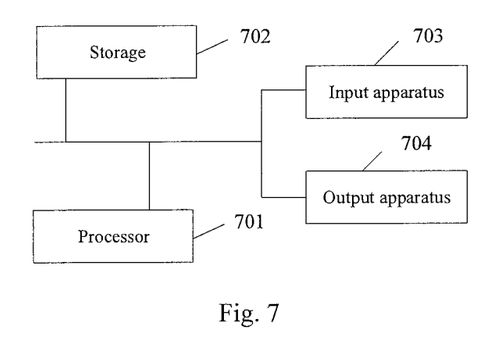
FIG. 7 is another structural schematic view of the image processing device according to some embodiments of the present disclosure.

Referring to FIG. 7, FIG. 7 is another structural schematic diagram of the image processing device provided in the present disclosure. The image processing device includes at least one processor 701, a storage 702, an input apparatus 703 and an output apparatus 704. For purpose of ease description, FIG. 7 shows one processor 701.

The processor 701, the storage 702, the input apparatus 703, and the output apparatus 704 may be connected by means of a bus or in other manners. For ease of description, a connection by means of the bus is used in FIG. 7.

The storage 702 may be a non-volatile computer readable storage medium, and may be used to store non-volatile software programs, non-volatile computer executable programs and modules, such as program instructions/modules corresponding to the image processing method of the present disclosure. The processor 701 is configured to execute the non-volatile software programs, instructions and modules stored in the storage 702, and execute various functional applications and data processing operations of the image processing device of the present disclosure, such as the image processing method described above in the present disclosure.

The storage 702 may include a program storage area and a data storage area, wherein the program storage area is used to store application programs required by an operating system and at least one function; the data storage area is used to store data created by the image processing device of the present disclosure when the image processing device is in operation. In addition, the storage 702 may include a high-speed random access storage, and may further include a non-volatile storage, for example, at least one magnetic disk storage device, a flash device, or other non-volatile solid-state storage devices. In some embodiments of the present disclosure, the storage 702 optionally may include storages remotely arranged relative to the processor 701, and the storage remotely arranged may be connected to the image processing device by means of a network. Examples of the network include, but are not limited to, an Internet, an enterprise intranet, a local area network, a mobile communication network, and a combination thereof.

The input apparatus 703 may receive input digital information or character information, and generate a key signal input related to a user setting and function control of the image processing device. The output apparatus 704 may include a display.

One or more modules are stored in the storage 702. When the one or more modules are executed by the at least one processor 701, the above-mentioned image processing method is executed.

The image processing device may execute the method provided in the present disclosure, and has functional modules and beneficial effects corresponding to the method. Technical details not described in details herein may be referred to the method provided in the embodiments of the present disclosure.

Optionally, the present disclosure further provides an electronic device including the above-mentioned image processing device.

The image processing device of the embodiments of the present disclosure may be presented in various forms, including, but not limited to:

(1) a mobile communication device: such a device is characterized by having a mobile communication function, and is targeted for providing voice and data communication. Such device include: a smart phone (such as an iPhone), a multimedia mobile phone, a functional mobile phone, a low-end mobile phone, and the like.

(2) an ultra-mobile personal computer device: such a device belongs to a category of personal computers, has calculation and processing functions, and generally also has a mobile internet-surfing feature. Such a device includes: a PDA (Personal Digital Assistant), an MID (Mobile Internet Device), a UMPC (Ultra-mobile Personal Computer) device, and the like, such as an iPad®.

(3) a portable entertainment device: such a device may display and play multimedia content. The device includes: an audio and video player (for example, an iPod), a palm game machine, an electronic book, an intelligent toy, and a portable vehicle-mounted navigation device.

(4) a server: a device for providing a computing service, wherein a configuration of the server includes a processor, a hard disk, a memory, a system bus and the like, and the server is similar to a general-purpose computer architecture. However, since the server needs to provide a high-reliability service, the server needs to have high processing capability, stability, reliability, safety, expandability, manageability and the like.

(5) Other electronic devices having a data interaction function.

The present disclosure further provides a nonvolatile computer-readable storage medium. Computer programs are stored in the non-volatile computer readable storage medium, wherein when the computer program is executed by a computer, the computer executes the image processing method of the present disclosure.

According to the above, the image processing method, the image processing device, the electronic device and the computer-readable storage medium in the present disclosure combine the super-pixel segmentation and the super-resolution reconstruction, and thus the region of interest may be extracted in accordance with the image feature of the target image to be acquired after the super-pixel segmentation is performed on the initial image, and then the optimized image may be acquired through the super-resolution reconstruction based on the region of interest, and accordingly the resolution of the optimized image is remarkably increased over the resolution of the initial image. As a result, through analyzing features of the target image, not only irrelevant interference information in the initial image may be eliminated, but also the image feature of the target image may be displayed more prominently. In other words, the optimized image with the higher definition and the higher resolution may be obtained in the present disclosure, thereby facilitating subsequent detection and identification operations.

It should be understood by a person of ordinary skills in the art that discussions of the above embodiments are merely exemplary, are not intended to imply that the scope of the present disclosure (including the claims) is limited to these embodiments; under the concept of the present disclosure, features in the above embodiments or different embodiments may be combined. Steps in the method of the present disclosure may be performed in any order, and may be varied in different aspects of the present disclosure, as stated above. For purpose of brevity, details of the embodiments are not provided in the present disclosure.

In addition, for ease of description and understanding, an integrated circuit (IC) and other components may be connected to a known power source or a ground, as shown or not shown in the drawings. The device may be shown in a form of a block diagram, so as to make the present disclosure be understood easily. Further facts as follow are considered, i.e., details on implementation of blocks in the device may highly depend on a platform on which the present disclosure is to be implemented (i.e., the details shall fall within a range understandable by a person skilled in the art). With these details (such as circuits) being described hereinabove for purpose of describing exemplary embodiments of the present disclosure, it is obvious for one skilled in the art that the embodiments of the present disclosure may be implemented without these details or with the details being changed. Hence, the above description is merely for illustrative purposes, but does not limit the scope of the present disclosure.

Although the embodiments of the present disclosure have been described hereinabove, a person skilled in the art may make a lot of substitutions, modifications and variations to these embodiments in accordance with the above description, and the substitutions, modifications and variations are obvious for the person skilled in the art. For example, any other storage structure (e.g., a dynamic RAM (DRAM)) may also be applied to the discussed embodiments.

Embodiments of the present disclosure are intended to cover all such substitutions, modifications and variations. Thus, any omissions, modifications, substitutions, improvements made within the sprint and principle of the present disclosure are all included within the protection scope of the present disclosure.

What is claimed is:

1. An image processing method, comprising:
   acquiring an initial image, performing super-pixel segmentation on the initial image, and acquiring final image blocks;
   extracting a region of interest from the final image blocks in accordance with an image feature of a target image; and
   performing super-resolution reconstruction on the region of interest and acquiring an optimized image.

2. The image processing method according to claim 1, wherein the performing super-pixel segmentation on the initial image comprises:
   (a) segmenting the initial image equally into the plurality of image blocks, setting an initial cluster center for each of the plurality of image blocks, and assigning a cluster tag to the each of the plurality of image blocks;
   (b) calculating a similarity between each pixel point in the initial image and a cluster center of each of the plurality of image blocks, selecting a cluster center corresponding to a highest similarity, and assigning, to the pixel point, a same cluster tag as a cluster tag assigned to one image block of the plurality of image blocks, wherein the cluster center corresponding to the highest similarity is located in the one image block of the plurality of image blocks;
   (c) determining new segmentation regions in accordance with the cluster tag assigned for each pixel point, and calculating a new cluster center for each of the new segmentation regions;
   (d) performing an iterative operation by repeating the (b) and the (c), until final cluster centers are acquired after the iterative operation converges; and
   (e) performing a cluster searching operation in accordance with the final cluster centers and cluster tags of segmentation regions in which the final cluster centers are located, and determining pixel points of each segmentation region of the segmentation regions in which each of the final cluster centers corresponding to the segmentation region is located, and acquiring the final image blocks corresponding to the segmentation regions.

3. The image processing method according to claim 2, wherein the similarity between each pixel point and the cluster center is calculated through following equations:

$$d_{lab} = \sqrt{(l_i - l_j)^2 + (a_i - a_j)^2 + (b_i - b_j)^2}$$
$$d_{xy} = \sqrt{(x_i - x_j)^2 + (y_i - y_j)^2}$$
$$d = d_{lab} + \frac{m}{S} d_{xy}$$
$$S = \sqrt{N/K},$$

wherein $d_{lab}$ is a color distance between a pixel point i and a cluster center of an image block j in a LAB color space, $d_{xy}$ is a coordinate distance between the pixel point i and the cluster center of the image block j in a X-Y coordinate system, d is a similarity between the pixel point i and the cluster center of the image block j, l is a luminance in the LAB color space, a and b are color parameters, x and y are coordinate parameters, m is an adjustment factor, S is a distance between initial cluster centers of two adjacent image blocks, N is a quantity of pixel points in the initial image, and K is a quantity of the image blocks initially segmented equally.

4. The image processing method according to claim 3, wherein the performing the cluster searching operation comprises:
   performing the cluster searching operation at a radius of k*S, where k is a searching radius coefficient.

5. The image processing method according to claim 1, wherein the image feature comprises at least one of a position feature, a color feature or a shape feature.

6. The image processing method according to claim 5, wherein the extracting the region of interest from the final image blocks in accordance with the image feature of the target image, comprises:
   setting different weight values for the plurality of image blocks at different positions in accordance with the position feature of the target image;
   extracting color regions associated with the color feature of the target image from the initial image in accordance with the color feature of the target image;
   extracting shape regions associated with the shape feature of the target image from the initial image in accordance with the shape feature of the target image; and
   extracting the region of interest in accordance with one or more of the color feature and the shape feature as well as the different weight values set for the plurality of image blocks at different positions.

7. The image processing method according to claim 6, wherein the setting different weight values for the plurality of image blocks at different positions, comprises:
   segmenting the initial image into a plurality of first portions and a second portion, and setting a weight value of the second portion as 0, and
   setting weight values of the plurality of first portions of the initial image to decrease gradually in a direction from the plurality of first portions to the second portion.

8. The image processing method according to claim 6, wherein the extracting the region of interest in accordance with one or more of the color feature and the shape feature as well as the different weight values set for the plurality of image blocks at different positions comprises:
   expanding a region acquired in accordance with the one or more of the color feature and the shape feature as well as the different weight values set for the image blocks at different positions, and acquiring the region of interest.

9. The image processing method according to claim 1, wherein the performing super-resolution reconstruction on the region of interest, comprises:
   scaling up the region of interest through a bicubic interpolation to a predetermined size and acquiring the scaled-up region; and
   performing a non-linear mapping operation on the scaled-up region through a convolutional network, and acquiring the optimized image having a high-resolution.

10. The image processing method according to claim 9, wherein the convolutional network comprises three convolutional layers, and sizes of convolution kernels in the three convolutional layers are 9×9, 1×1, and 5×5 respectively, and an amount of features outputted by first and second convolutional layers of the three convolutional layers are 64 and 32, respectively.

11. The image processing method according to claim 1, wherein an initial cluster center of each of the plurality of image block is a pixel point corresponding to a geometrical center or a gravity center of the image block.

12. The image processing method according to claim 3, wherein the cluster center corresponding to the highest similarity is a cluster center corresponding to a minimum value of the similarity d.

13. The image processing method according to claim 1, further comprising:
    detecting a target in the optimized image through a Histogram of Oriented Gradients (HOG) and a Support Vector Machine (SVM).

14. An image processing device, comprising:
    a super-pixel segmentation circuitry, configured to acquire an initial image, performing super-pixel segmentation on the initial image, and acquire final image blocks;
    a region-of-interest extraction circuitry, configured to extract a region of interest from the final image blocks in accordance with an image feature of a target image; and
    a super-resolution reconstruction circuitry, configured to perform super-resolution reconstruction on the region of interest and acquiring an optimized image.

15. The image processing device according to claim 14, wherein the super-pixel segmentation circuitry is further configured to:
    (a) segment the initial image equally into the plurality of image blocks, set an initial cluster center for each of the plurality of image blocks, and assign a cluster tag to the each of the plurality of image blocks;
    (b) calculate a similarity between each pixel point in the initial image and a cluster center of each of the plurality of image blocks, select a cluster center corresponding to a highest similarity, and assign, to the pixel point, a same cluster tag as a cluster tag assigned to one image block of the plurality of image blocks, wherein the cluster center corresponding to the highest similarity is located in the one image block of the plurality of image blocks;
    (c) determine new segmentation regions in accordance with the cluster tag assigned for each pixel point, and calculate a new cluster center for each of the new segmentation regions;
    (d) perform an iterative operation by repeating the (b) and the (c), until final cluster centers are acquired after the iterative operation converges; and
    (e) perform a cluster searching operation in accordance with the final cluster centers and cluster tags of segmentation regions in which the final cluster centers are located, and determine pixel points of each segmentation region of the segmentation regions in which each of the final cluster centers corresponding to the segmentation region is located, and acquire the final image blocks corresponding to the segmentation regions.

16. The image processing device according to claim 15, wherein the similarity between each pixel point and the cluster center is calculated through following equations:

$$d_{lab} = \sqrt{(l_i - l_j)^2 + (a_i - a_j)^2 + (b_i - b_j)^2}$$

-continued $$d_{xy} = \sqrt{(x_i - x_j)^2 + (y_i - y_j)^2}$$

$$d = d_{lab} + \frac{m}{S}d_{xy}$$

$$S = \sqrt{N/K},$$

wherein $d_{lab}$ is a color distance between a pixel point i and a cluster center of an image block j in a LAB color space, $d_{xy}$ is a coordinate distance between the pixel point i and the cluster center of the image block j in a X-Y coordinate system, d is a similarity between the pixel point i and the cluster center of the image block j, l is a luminance in the LAB color space, a and b are color parameters in the LAB color space, x and y are coordinate parameters, m is an adjustment factor, S is a distance between initial cluster centers of two adjacent image blocks, N is a quantity of pixel points in the initial image, and K is a quantity of the image blocks initially segmented equally.

17. The image processing device according to claim 16, wherein the super-pixel segmentation circuitry is further configured to perform the cluster searching operation at a radius of k*S, where k is a searching radius coefficient.

18. The image processing device according to claim 14, wherein the image feature comprises at least one of a position feature, a color feature or a shape feature,
    wherein the region-of-interest extraction circuitry is further configured to:
    set different weight values for the plurality of image blocks at different positions in accordance with the position feature of the target image;
    extract color regions associated with the color feature of the target image from the initial image in accordance with the color feature of the target image;
    extract shape regions associated with the shape feature of the target image from the initial image in accordance with the shape feature of the target image; and
    extract the region of interest in accordance with one or more of the color feature and the shape feature as well as the different weight values set for the plurality of image blocks at different positions.

19. The image processing device according to claim 14, wherein the super-resolution reconstruction circuitry is further configured to:
    scale up the region of interest through a bicubic interpolation to a predetermined size and acquire the scaled-up region; and
    perform a non-linear mapping operation on the scaled-up region through a convolutional network, and acquire the optimized image having a high-resolution.

20. An image processing device, comprising:
    at least one processor, and
    a storage in communication with the at least one processor and configured to store instructions executable by the at least one processor, wherein when the instructions are executed by the at least one processor, the at least one processor implements the image processing method according to claim 1.

* * * * *